C. H. DOUGLAS.
SAW
APPLICATION FILED APR. 15, 1912.

1,033,996.

Patented July 30, 1912.

WITNESSES:
Orrin M. Bowen
Chas. S. Scovs

INVENTOR
Charles H. Douglas

UNITED STATES PATENT OFFICE.

CHARLES H. DOUGLAS, OF QUINCY, MICHIGAN.

SAW.

1,033,996.

Specification of Letters Patent. Patented July 30, 1912.

Application filed April 15, 1912. Serial No. 690,892.

*To all whom it may concern:*

Be it known that I, CHARLES H. DOUGLAS, a citizen of the United States, and a resident of Quincy, in the county of Branch and State of Michigan, have invented certain new and useful Improvements in Saws, of which the following is a specification.

My invention relates to improvements in the teeth of saws, and the object is to provide a saw that will cut easily and accurately through timber of every quality and kind without scoring or roughening the walls of the kerf, and without consuming as much power to do a given amount of work as other saws. I attain this object by the form and construction of the saw-teeth herein described and illustrated in the accompanying drawings.

Figure 1:
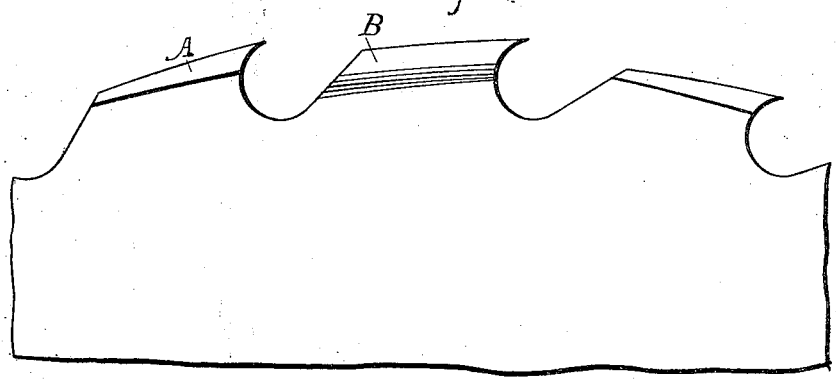
Figure 2:
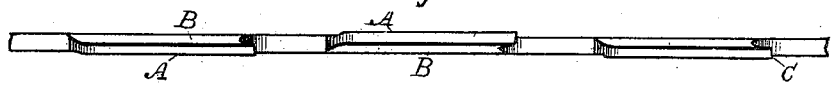
Figure 3:
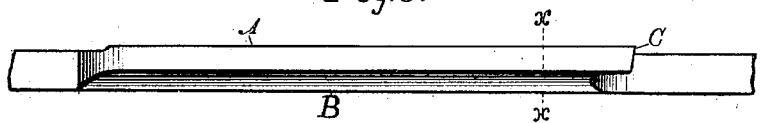
Figure 4:
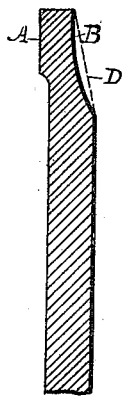

Figure 1 is a small portion of a circular saw, showing a few of the improved teeth. Fig. 2 is an edge view of the same. Fig. 3 is an enlarged view of one tooth. Fig. 4 is a cross section through line $x\ x$, Fig. 3.

Similar letters refer to similar parts throughout the several views.

The teeth are formed with a clearance on the back or outer edge of each tooth, from the point or cutting edge to the heel, of about five degrees from the line of the periphery of the saw blade, for the purpose of causing them to make easy and clean chisel cuts in the wood, and thus to avoid, as far as possible, breaking it into saw-dust. On one side of each tooth there is a flat rib A, which extends from the cutting point to the heel, and on the opposite side of each is a concave bevel B. These ribs are on alternate sides of the teeth and project beyond the surface of the blade about one hundredth of an inch at the cutting point, and a trifle less at the rear. The object of the ribs is to widen the cutting points of the teeth and at the same time to present a flat surface against the walls of the kerf that will protect them from being scored or roughened while sawing. The object of the bevels is to narrow the cutting points of the teeth to about half the width of the kerf. In my former patent this bevel was made flat, as represented by the dotted line D in Fig. 4 and consequently the teeth were thicker at the bottom of the ribs than at the cutting points, and consequently entered the wood like wedges, which caused undue friction while sawing, and also had a tendency to divert the saw from a straight line. To obviate this difficulty, the bevel B is made concave, as shown in Fig. 4, which brings that side of each tooth about parallel with the rib A to the depth of any chip it may cut.

The chisel points C, are made on a slight angle, and form an acute angle with the face of the ribs A, which gives the teeth an easier cut and better effect in cross-cutting.

In this saw invention I have sought to so form the teeth that they may reach the acme of both simplicity and perfection. In this I have succeeded so well that in all the numerous tests that have been given them, they saw equally well every kind or quality of timber, be it green and dry, and in every direction through the grains, without necessitating the least variation from the form of the teeth herein described.

In the test of these improved saws made by the U. S. Government officials at the Forest Products Laboratory, it was demonstrated that they had the following points of superiority over other saws: 1. They do very much better surface work. 2. They require 25% less power. 3. They waste 20% less wood in the kerf. 4. They are more rapid in sawing. 5. They can be sharpened in one-fourth the time.

Having fully described my invention, what I claim and desire to secure by Letters Patent is—

1. A saw provided with teeth so formed that their backs or outer edges have a slope of about five degrees angle from the line of the periphery of the blade, and on the sides of which there are ribs A A, which extend from the cutting points to or toward the heels, and on the opposite sides there are concave bevels B, B, of such concavity that the points of the teeth do not increase in thickness for at least a portion of their depth; substantially as and for the purpose herein specified.

2. A saw tooth that is provided with a rib A, on one side, which extends from the cutting point of said tooth to or toward the heel, and a concave bevel B, on the other side, of such concavity that the point of the tooth does not increase in thickness for that portion of its depth which enters the wood at each cut while sawing; substantially as and for the purpose specified.

3. A saw tooth that has in combination a rib A on one side, a concave bevel B of such concavity that the point of the tooth does not increase in thickness for at least a portion of its depth, on the other side, and a cutting point C that is a chisel point which is at an acute angle with the face of the rib A, substantially as herein specified.

Signed at Quincy in the county of Branch and State of Michigan this 11th day of April A. D. 1912.

CHARLES H. DOUGLAS.

Witnesses:
  ORRIN M. BOWEN,
  M. D. GREENING.